United States Patent [19]

Gasparaitis et al.

[11] Patent Number: 5,025,921
[45] Date of Patent: Jun. 25, 1991

[54] ENVIRONMENTAL RADIO GUARD

[75] Inventors: Bernard V. Gasparaitis, Tamarac; José Ruiz, Miami; Donald F. Gatto, Coral Springs, all of Fla.

[73] Assignee: Motorola, Inc., Schaumburg, Ill.

[21] Appl. No.: 574,561

[22] Filed: Aug. 17, 1990

[51] Int. Cl.$^5$ .................... B65D 85/38; B65D 65/02
[52] U.S. Cl. .................... 206/320; 455/351; 224/240; 150/165; 206/521
[58] Field of Search ............... 455/351; 206/320, 523; 150/901, 154, 165; 224/253, 908

[56] References Cited

U.S. PATENT DOCUMENTS

| 2,467,471 | 4/1949 | Goldstein | 150/165 |
|---|---|---|---|
| 3,081,807 | 3/1963 | Lightburn | 206/320 |
| 3,959,610 | 5/1976 | Finnegan et al. | 200/5 A |
| 4,006,764 | 2/1977 | Yamamoto et al. | 206/320 |
| 4,071,065 | 1/1978 | Halbich | 206/320 |
| 4,225,970 | 9/1980 | Jaramillo et al. | 455/89 |
| 4,420,078 | 12/1983 | Belt et al. | 224/253 |
| 4,489,770 | 12/1984 | Reich, II | 206/320 |
| 4,584,718 | 4/1986 | Fuller | 455/351 |
| 4,775,083 | 10/1988 | Burger et al. | 224/253 |
| 4,855,845 | 8/1989 | Thrush | 206/320 |
| 4,901,852 | 2/1990 | King | 206/320 |

FOREIGN PATENT DOCUMENTS

| 2904132 | 8/1980 | Fed. Rep. of Germany | 206/320 |
|---|---|---|---|
| 00654 | 3/1981 | PCT Int'l Appl. | 455/351 |
| 377714 | 6/1964 | Switzerland | 150/154 |

OTHER PUBLICATIONS

Sales brochure from Icom Marine Shows a Waterproof on-Shape-Conforming Radio Baggy which completely protects the handheld transceiver from water and floats if dropped overboard.

Primary Examiner—William I. Price
Attorney, Agent, or Firm—Juliana Agon

[57] ABSTRACT

A protective cover (20) for a communication device (10) comprises a protective layer having a shape closely resembling the shape of said communication device (10) to closely contour to said communication device (10).

11 Claims, 1 Drawing Sheet

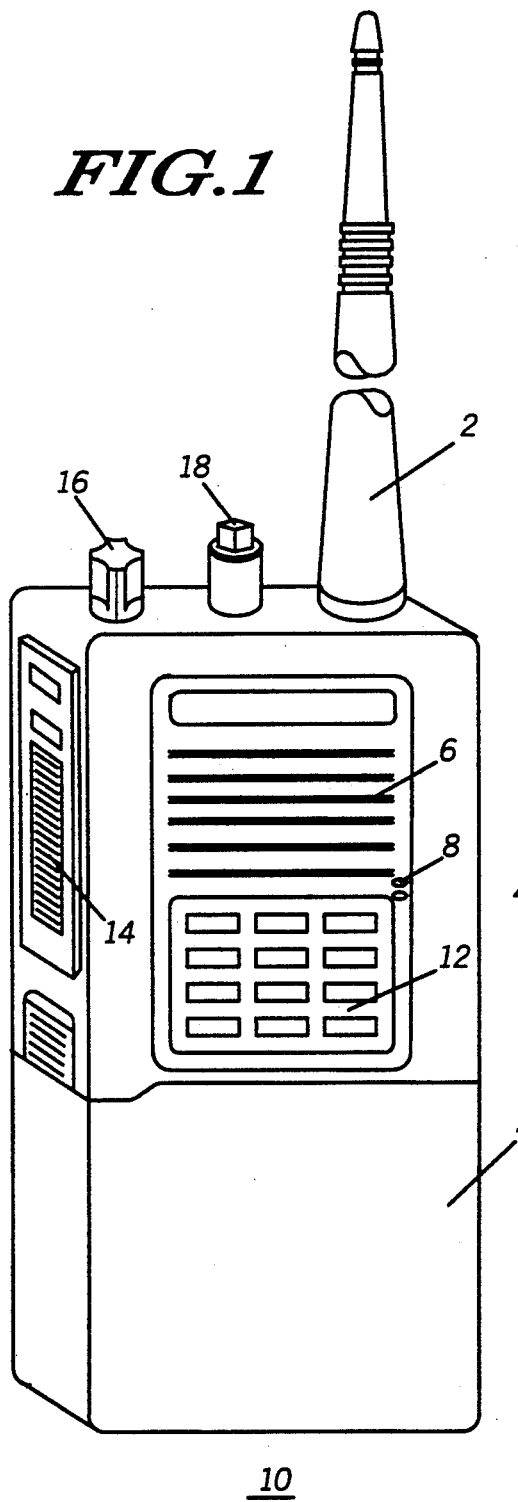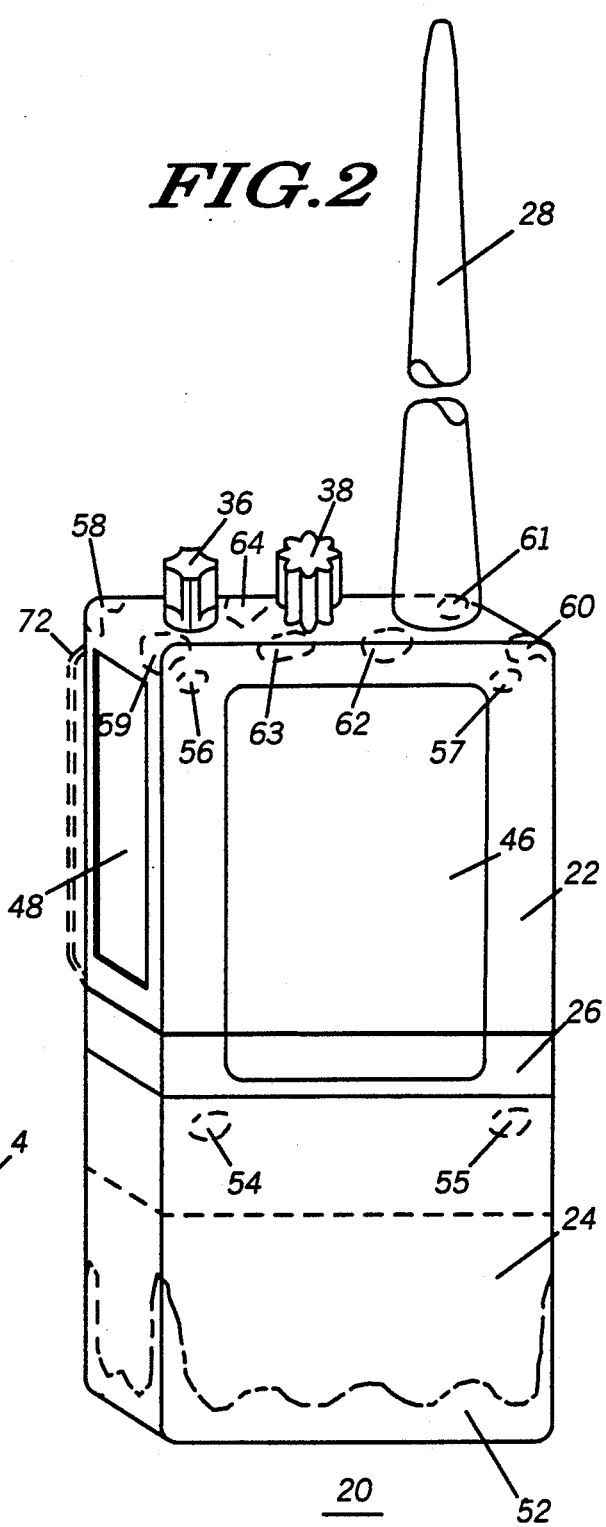

ENVIRONMENTAL RADIO GUARD

This is a continuation of application Ser. No. 07/422,269 filed Oct. 16, 1989 and now abandoned.

Technical Field

This invention relates generally to a cover for a hand held portable communication device and more particularly to a molded thin film plastic cover for a communication device.

BACKGROUND

Communication devices such as portable radios and pagers are often operated in extremely severe chemical environments. The current radio housings, made from a polymer material, will very quickly undergo chemical material degradation in an environment where highly corrosive chemicals (such as acetone, toluene, MEK, trichloroethane or other combinations of acids and alkalines) are present. In such areas, chemical fumes (vapors and gasses), chemical liquids, sprays, powders and solids cause the polymer to dissolve or induce stress cracks in the polymer housing material. In marine environments, such as on an oil rig, the portable radio is constantly exposed to sea water and salt spray which forms an electrolite and can attack the metal parts of the radio.

Even when the radio is not operated in a harsh environment, the radio may be accidentally immersed in liquids which could cause internal damage to the unit, or be dropped onto a hard concrete floor. Therefore, a need exists to protect the portable radio in such circumstances and environments and allow operation of the radio at the same time.

SUMMARY OF THE INVENTION

Accordingly, it is an object of the present invention to protect a communication device while providing operational access to the device.

Briefly, according to the invention, a protective cover is provided for a communication device having a protective layer having a shape closely resembling the shape of said communication device to closely contour to said communication device.

BRIEF DESCRIPTION OF THE DRAWINGS

FIG. 1 is a prospective view of a portable radio.

FIG. 2 is a prospective view of a protective cover in accordance with the present invention for use with the radio of FIG. 1.

DETAILED DESCRIPTION OF THE PREFERRED EMBODIMENT

Referring to FIG. 1, a radio 10 is illustrated as having an antenna 2, a battery compartment 4 containing internal batteries, a speaker 6 and a microphone 8. For operation by an operator, the radio 10 also includes a keypad 12, a press-to-talk key 14, and a first and second knob 16 and 18.

Referring to FIG. 2, a protective cover 20 for the radio 10 is illustrated. The cover 20 is made of a very thin chemical inert material which resists high concentrations of acids, alkalines and submersible fluids for a limited time and depth. This material which may be a rubber, elastic or plastic, non-porous, watertight material such as polyethylene or teflon may be injected, extruded, blown or dip molded, thermo formed, or electrostatic powder fused to cover 20. By a combination of the processing methods (injection blow molding and fusing) the thickness of the material can be controlled to form a contoured replica of the radio 10. To enable an operator to replace the batteries in the battery compartment 4 of the radio 10, or to simply remove and put back the protective cover 20 for any reason, the protective cover 20 has a removable top portion 22 and a bottom portion 24. For forming a water-tight seal around the battery, the top and bottom portions 22 and 24 overlap in an area 26 over the edge of the battery compartment 4 of the radio 10. In this area 26, the thickness of the material is especially designed to provide a tight elastic seal.

To contour to the shape of the radio 10, the top portion 22 of the protective cover 20 has an enclosed tube 28 to fit over the antenna 2 of the radio 10. The top portion 22 also includes a first and second serrated resilent tube-like covers 36 and 38 for flexible operation of the first and second knots 16 and 18 of the radio 10. These serrated tubes 36 and 38 are designed to provide sufficient flexibility and friction for controlling the knots 16 and 18, respectively. The top portion 22 also includes an extended window cover 46 to protect the speaker 6, microphone 8, and the keypad 12 of the radio 10. A second extended window cover 48 is also informed from the top portion 22 to protect the press-to-talk key 14 of the radio 10. These two extended window covers 46 and 48 have their thickness controlled such that the material is thin enough for good tactile feel and accessibility to the press-to-talk key 14 and the keypad 12 of the radio 10. Furthermore, the extended window cover 46 is thin enough to allow sound to go to the microphone 8 and from the speaker 6 without a substantial volume degradation.

Finally, the protective cover 20 includes a bottom layer of shock pads 52 on the bottom portion 26 of the cover 20, and shock pads 54 through 64 on the top portion 22 of the cover 20. To provide impact relief, these shock pads are formed from the material and designed in such a way to be much thicker in these areas. Shock pad 52 cushions the bottom, shock pads 54 through 57 protect the front, shock pads 58 through 61 protect the four top corners, and shock pads 62–64 absorb impact on the top edges of the radio from drops.

From the foregoing description of the invention, it is obvious to provide more or less shock pads as needed and to contour the shape of the protected cover 20 to protect a communication transceiver of any other potential shape. It is also possible to modify the present embodiment to accommodate optional accessories, such as a belt clip 72 to be attached on the back of the protective cover 20. The belt clip 72 would then enable the portable radio to be attached to the operator. Similarly, the seal of the present embodiment can be made more complicated by another sealing and locking arrangement, such as a type where snapping pins are attached to holes.

What is claimed is:

1. A protective cover for a communication device comprising:
    a protective layer having a first detachable portion and a second detachable portion overlappable around said communication device to have a shape enclosing and closely resembling the shape of said communication device; and
    at least one serrated tube for permitting turning a rotary knob of said communication device.

2. The protective cover of claim 1 wherein said protective layer is flexibly resilient for permitting operation of said communication device.

3. The protective cover of claim 2 wherein said protective layer includes serrations for rotating a knob of said communication device.

4. The protective cover of claim 1 wherein said protective layer comprises a plastic material for sealing said communication device.

5. The protective cover of claim 1 wherein said protective layer comprises a non-porous material for sealing said communication device.

6. The protective cover of claim 1 wherein said protective layer comprises a water-tight material for waterproofing said communication device.

7. The protective cover of claim 1 wherein said protective layer comprises a polyethylene material for sealing said communication device.

8. The protective cover of claim 1 wherein said protective layer having at least one curved area of increased thickness on at least one of the inner surfaces thereof so as to provide shock absorption means for protecting said communication device against drops.

9. The protective cover of claim 1 wherein said protective layer includes attachment means for attaching said communication device to an operator.

10. A protective cover for a communication device, comprising:
a protective layer having a first detachable portion and a second detachable portion inter-engagable to have a contour corresponding to said communication device; and
environmental sealing means for sealing and overlapping said first and second detachable portions of said protective layer around said communication device; and
at least one serrated tube for permitting turning a rotary knob of said communication device.

11. The protective cover of claim 10 wherein said environment sealing means is positioned substantially around a battery of said communication device.

* * * * *